United States Patent
Nagura et al.

(10) Patent No.: US 7,127,342 B2
(45) Date of Patent: Oct. 24, 2006

(54) DRIVING FORCE DISTRIBUTION CONTROL DEVICE FOR VEHICLE

(75) Inventors: Tatsunori Nagura, Tokyo (JP); Haruo Fujiki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 304 days.

(21) Appl. No.: 10/665,261

(22) Filed: Sep. 22, 2003

(65) Prior Publication Data

US 2004/0059490 A1    Mar. 25, 2004

(30) Foreign Application Priority Data

Sep. 20, 2002    (JP)    ............... 2002-275531

(51) Int. Cl.
  *B60W 10/02*    (2006.01)
  *G06F 19/00*    (2006.01)
(52) U.S. Cl. .................. 701/69; 701/51; 701/54; 701/69; 477/77; 477/76
(58) Field of Classification Search .............. 701/69, 701/65, 58, 54, 51, 59, 61, 62; 192/3.51
  See application file for complete search history.

(56) References Cited

U.S. PATENT DOCUMENTS

| | | | | |
|---|---|---|---|---|
| 5,448,478 A | * | 9/1995 | Eto | .............. 701/69 |
| 5,461,568 A | * | 10/1995 | Morita | .............. 701/88 |
| 6,070,685 A | * | 6/2000 | Takasaki et al. | ............. 180/250 |
| 6,450,921 B1 | * | 9/2002 | Glab et al. | .................. 177/174 |
| 6,497,301 B1 | * | 12/2002 | Iida et al. | ................... 180/249 |
| 6,697,725 B1 | * | 2/2004 | Williams | ..................... 701/69 |
| 2003/0036837 A1 | * | 2/2003 | Katayama et al. | ............ 701/69 |
| 2005/0145460 A1 | * | 7/2005 | Forsyth et al. | ............ 192/103 F |

FOREIGN PATENT DOCUMENTS

JP        2599965        1/1997

* cited by examiner

*Primary Examiner*—Thomas G. Black
*Assistant Examiner*—Christine Behncke
(74) *Attorney, Agent, or Firm*—McGinn IP Law Group, PLLC

(57) ABSTRACT

In a specific control state, confirmation is made whether or not the present torque limiter value exceeds a maximal value of an allowed torque value in the specific control state, and in the event that the present torque limiter value exceeds the maximal value of the allowed torque value in the specific control state, the torque limiter value is slowly lowered by subtracting a constant A1 from the present torque limiter value, while in the event of transition from the specific control state to an ordinary control state, the torque limiter value is slowly raised to the maximal torque limiter value in the ordinary control state by adding a constant A2 to the present torque limiter value. Thus, excessive change of torque at transition of a control state can be suppressed, and adverse effects on driving stability and driving performance under the specific control state can be minimized.

9 Claims, 3 Drawing Sheets

DRIVING FORCE DISTRIBUTION CONTROL DEVICE FOR VEHICLE

The disclosure of Japanese Patent Application No. 2002-275531 filed on Sep. 20, 2002 including the specification, drawings and abstract is incorporated herein by reference in its entirety.

BACKGROUND OF THE INVENTION

1. Field of the Invention

The present invention relates to a driving force distribution control device for a vehicle which controls engaging force of a coupling mechanism so as to change transmission torque, and distributes driving force.

2. Description of the Related Art

Conventionally, with a driving force transmission system for four-wheel-drive vehicles and so forth, a system has been known wherein a coupling mechanism made up of a multiple disc clutch and the like is disposed within a transfer, and controlling engaging torque of this coupling mechanism continuously controls distribution of driving force toward the rear wheel side.

With such a system, a torque limiter for limiting engaging torque of the coupling mechanism is provided. For example, Japanese Patent No. 2,599,965 discloses art wherein, with a four-wheel-drive vehicle having a center differential for dividing driving force output from the engine so as to transmit the divided force to a front-wheel-drive system and a rear-wheel-drive system, a mechanical torque limiter is disposed on the rear-wheel-drive system (or the front-wheel-drive system), and while this torque limiter is running, limiting differential of the center differential enables jackrabbit starts and rapid acceleration.

However, the conventional torque limiter fixes the transmission torque at a constant value, so in the event of mounting nonstandard-diameter tires or in the event of performing specific control in a state wherein oil temperature of the differential (especially the rear differential) rises abnormally, deterioration of driving performance is brought about, and also in the event of transition from an ordinary control state to a specific control state or in the event of switching of the control state at recovery from the specific control state to the ordinary control state, the engaging torque is drastically changed, thereby causing problems such as deterioration for driving stability and driving performance.

SUMMARY OF THE INVENTION

Accordingly, it is an object of the present invention to provide a driving force distribution control device for a vehicle wherein adverse effects on driving stability and driving performance, under a specific control state for protecting a driving force transmission system, can be kept to a minimum.

Briefly, the driving force distribution control device for a vehicle according to the present invention, comprises: means for continuously changing a torque limiter which limits engaging force of the coupling mechanism, from a limiter value in an ordinary control state according to a driving state, to a limiter value in a specific control state for protecting a driving force transmission system; and means for controlling engaging force of the coupling mechanism in the specific control state so as to keep below the limiter value in the specific control state.

Other features and advantage of the present invention will become sufficiently clear by the following description in detail.

DETAILED DESCRIPTION OF THE PREFERRED EMBODIMENTS

Figure 1:
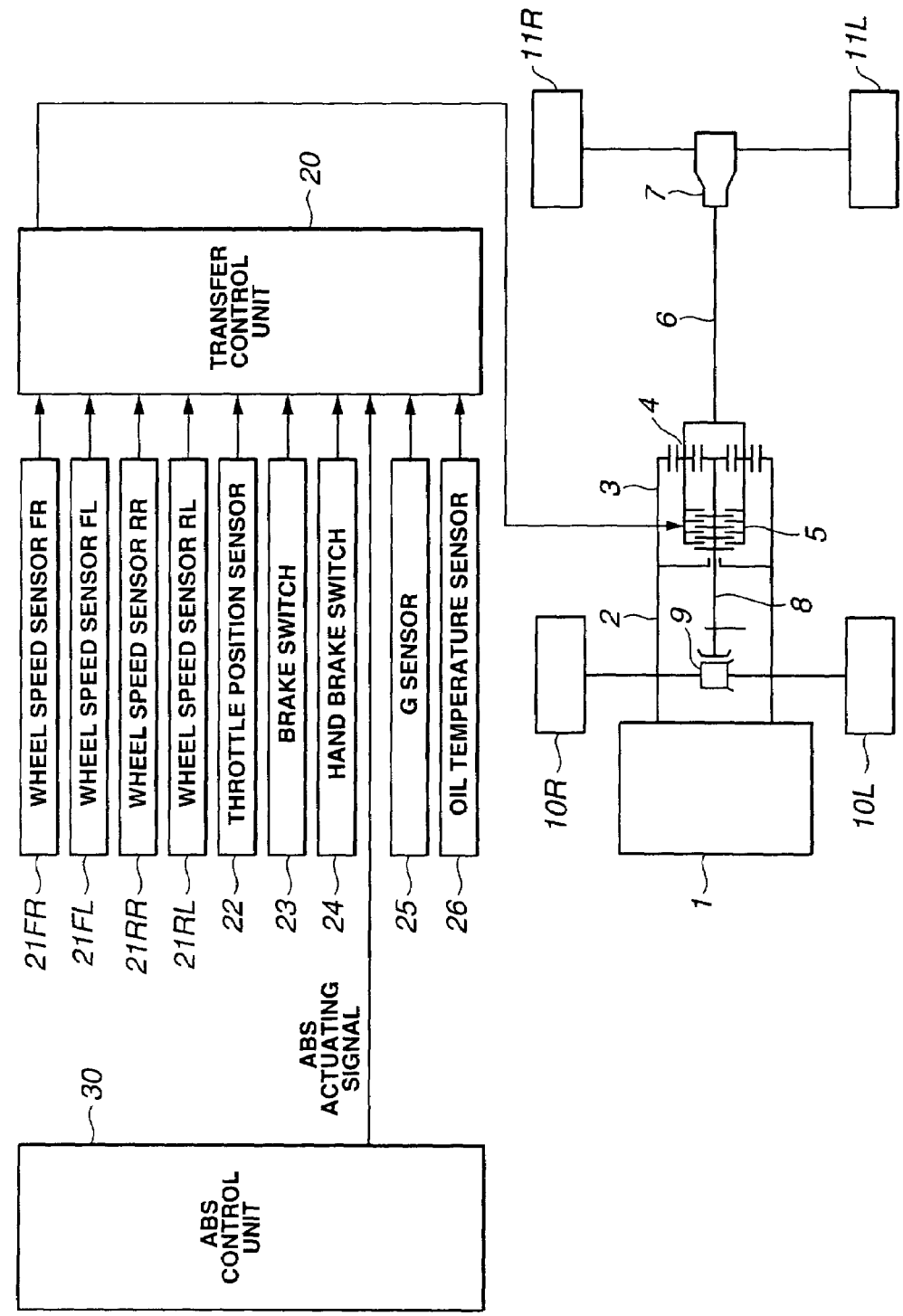
FIG. 1 is a schematic configuration diagram of a system.

First of all, description will be made with regard to a driving force transmission system for a four-wheel-drive vehicle, with reference to FIG. 1. In the drawing, reference numeral 1 denotes an engine, and a transmission 2 is connected to the output axis of the engine 1. A transfer 3 is integrally linearly connected to the rear portion of the transmission 2. The transfer 3 comprises a center differential with a planetary gear mechanism 4 to which driving force is input from a transmission 2, and a transfer clutch 5 made up of a multiple disc clutch with engaging torque computerized by a transfer control unit 20 described later as a coupling mechanism, linearly connected to the planetary gear mechanism 4. Following the output from the engine 1 being shifted to the predetermined gear by the transmission 2, the driving force is distributed to the front wheel side and the rear wheel side via the transfer 3.

With this configuration, the output side of the transmission 2 is connected to a ring gear of the planetary gear mechanism 4, and a carrier which supports rotatable pinions meshing with this ring gear and a sun gear is connected to a rear differential 7 via a propeller shaft 6. Moreover, a carrier of the planetary gear mechanism 4 is connected to a clutch drum of the transfer clutch 5, and the sun gear is connected to a clutch hub of the transfer clutch 5, and also connected to a front differential 9 via a front drive shaft 8.

The transfer clutch 5 comprises a driving mechanism for pressing a detachable clutch plate disposed in a row between the clutch drum and the clutch hub via the carrier, which comprises an electromagnetic driving mechanism made up of an electromagnetic clutch and a cam for amplifying torque, so that controlling the exciting current of this electromagnetic driving mechanism controls the engaging torque.

Moreover, the driving force input from the transmission 2 to the planetary gear mechanism 4 is transmitted to the left and right rear wheels 11L and 11R via the carrier through the rear differential 7, and also differential output between the carrier corresponding to the engaging force of the transfer clutch 5 and the sun gear is transmitted to the left and right front wheels 10L and 10R via the front differential 9. That is to say, in the event that the transfer clutch 5 is in a complete engaging state, the carrier and the sun gear are integrally fixed so as to perform even distribution of torque to the front wheel side and the rear wheel side, and in the event that the transfer clutch 5 is in a disengaged state, torque is disproportionately distributed to the rear wheels.

The engaging torque from the transfer clutch 5 computerized by the transfer control unit 20 primarily made up of a microcomputer. Signals from various kinds of sensors and switches and so forth for detecting an engine running state and a driving state, and control signals from other control units and the like are input to this transfer control unit 20, with an instruction value for engaging torque being calculated based on these signals.

The signals input to the transfer control unit 20, as shown in FIG. 1, include signals from a wheel speed sensor 21FR for detecting wheel speed of the right front wheel 10R, a wheel speed sensor 21FL for detecting wheel speed of the left front wheel 10L, a wheel speed sensor 21RR for detecting wheel speed of the right rear wheel 11R, a wheel speed sensor 21RL for detecting wheel speed of the left rear wheel 11L, a throttle opening sensor 22 for detecting opening of a throttle valve of the engine 1, a brake switch 23 which is turned on by stepping on a brake pedal, a hand brake switch 24 which is turned on by pulling a hand brake lever, an ABS actuating signal from an ABS control unit 30, a lateral acceleration sensor 25 for detecting acceleration in a lateral direction of the vehicle, an oil temperature switch 26 which turns on in the event that the oil temperature exceeds a preset temperature and enters a high temperature state, and so forth.

With the above-described engaging torque control of the transfer clutch 5, special processing for protecting a driving force transmission system such as the transmission 2, transfer 3, rear differential 7, and front differential 9 is not required, and a variable torque limiter, which continuously changes in both an ordinary control state wherein the engaging torque of the transfer clutch 5 is controlled according to a driving state, and a specific control state wherein the engaging torque of the transfer clutch 5 must be reduced so as to protect the driving force transmission system, is provided.

Moreover, in the event of transition from the ordinary control state to the specific control state or in the event of recovery from the specific control state to the ordinary control state, controlling the engaging torque of the transfer clutch 5 so as to be restrained below the variable torque limiter in all states avoids excessive change of engaging torque, and avoids excessive rise in oil temperature in each portion and deterioration of performance of each part, thereby suppressing deterioration of driving stability and driving performance.

Now, the control states indicated by the following (1) through (3) are representative examples of specific control.

(1) A control state when mounting nonstandard-diameter tires wherein the left and right front wheels 10L and 10R, and left and right rear wheels 11L and 11R, are not the same in tire size.

(2) A control state wherein abnormal rise in oil temperature is detected by any of the transmission 2, transfer clutch 5, rear differential 7, or front differential 9.

(3) A control state when abnormal differential rotation between the front and rear wheels is detected in a state of the transfer clutch 5 being engaged to a certain degree (for example, a control state such as jack-rabbit starts with moderate opening of the accelerator, or a control state when driving on an uneven road surface such as a dirt road or the like).

Figure 2:
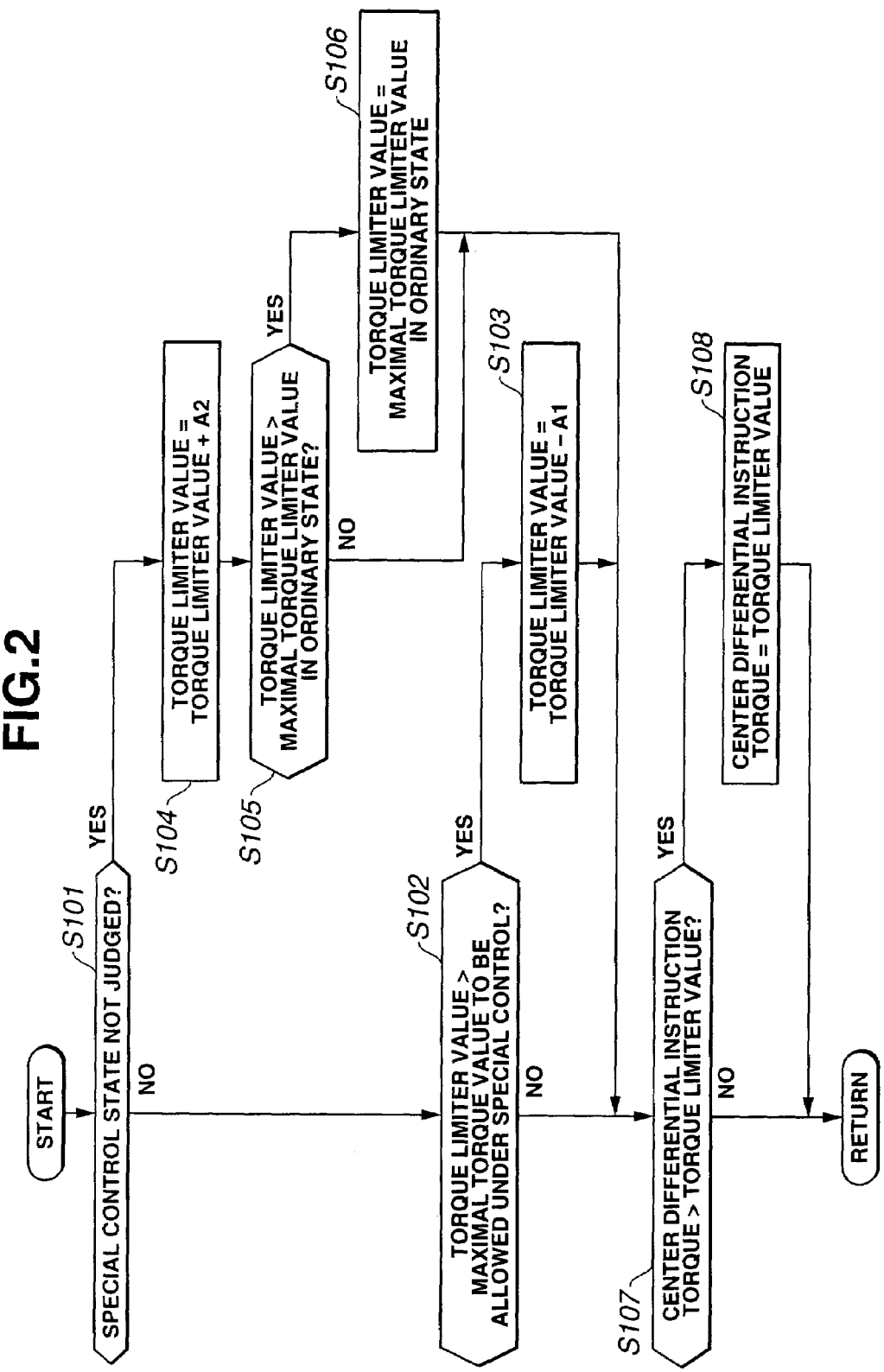
FIG. 2 is a flowchart of torque limiter control processing.

The following description will be made with regard to torque limiter control processing by the transfer control unit 20, with reference to the flowchart shown in FIG. 2.

In this torque limiter control processing, first of all, in Step S101, confirmation is made with regard to whether or not a specific control state such as at mounting nonstandard-diameter tires or the like is currently determined. For example, in the event that mounting of nonstandard-diameter tires is determined based on signals from the front and rear wheel speed sensors 21FR, 21FL, 21RR, and 21RL, confirmation is made whether or not transition from the ordinary control state to the specific control state has been performed by this mounting nonstandard-diameter tires, or whether or not transition from the specific control state to the ordinary control state by disengaging the determination.

Moreover, in the event of the determination for the specific control state is made, the processing proceeds from Step S101 to Step S102, where confirmation is made whether or not the present torque limiter value exceeds the maximal torque value allowed at the specific control state. The maximal torque value allowed at the specific control state is the maximal torque value capable of protecting the driving force transmission system, so taking the output from the engine or the configuration of the driving force transmission system or the like into consideration, this value is set beforehand as the maximal torque value wherein oil temperature at each unit, and the oil temperature of the rear differential 7 in particular, does not exceed the preset temperature for mounting nonstandard-diameter tires.

Consequently, in the event that the present torque limiter value does not exceed the maximal torque value allowed at the specific control state, the processing proceeds from Step S102 to Step S107. Also, in the event that the present torque limiter value exceeds the maximal torque value allowed at the specific control state, the processing proceeds from Step S102 to Step S103, where the torque limiter value is updated by subtracting the predetermined constant A1 from the present torque limiter value, which lowers the torque limiter value slowly toward the maximal torque value allowed at the specific control state, and the processing proceeds to Step S107.

In Step S107, confirmation is made whether or not the instruction value of the engaging torque (center differential instruction torque) of the transfer clutch 5 which is set according to the driving state of the vehicle, for example, the center differential instruction torque which is set based on the load on the engine such as throttle opening or the like and the vehicle speed, exceeds the torque limiter value. In the event of the center differential instruction torque does not exceed the torque limiter value, the processing escapes from the routine without changing the center differential instruction torque, and in the event that the center differential instruction torque exceeds the torque limiter value, the processing proceeds from Step S107 to Step S108 so as to regulate the center differential instruction torque with the torque limiter value, and then escapes from the routine.

Figure 3:
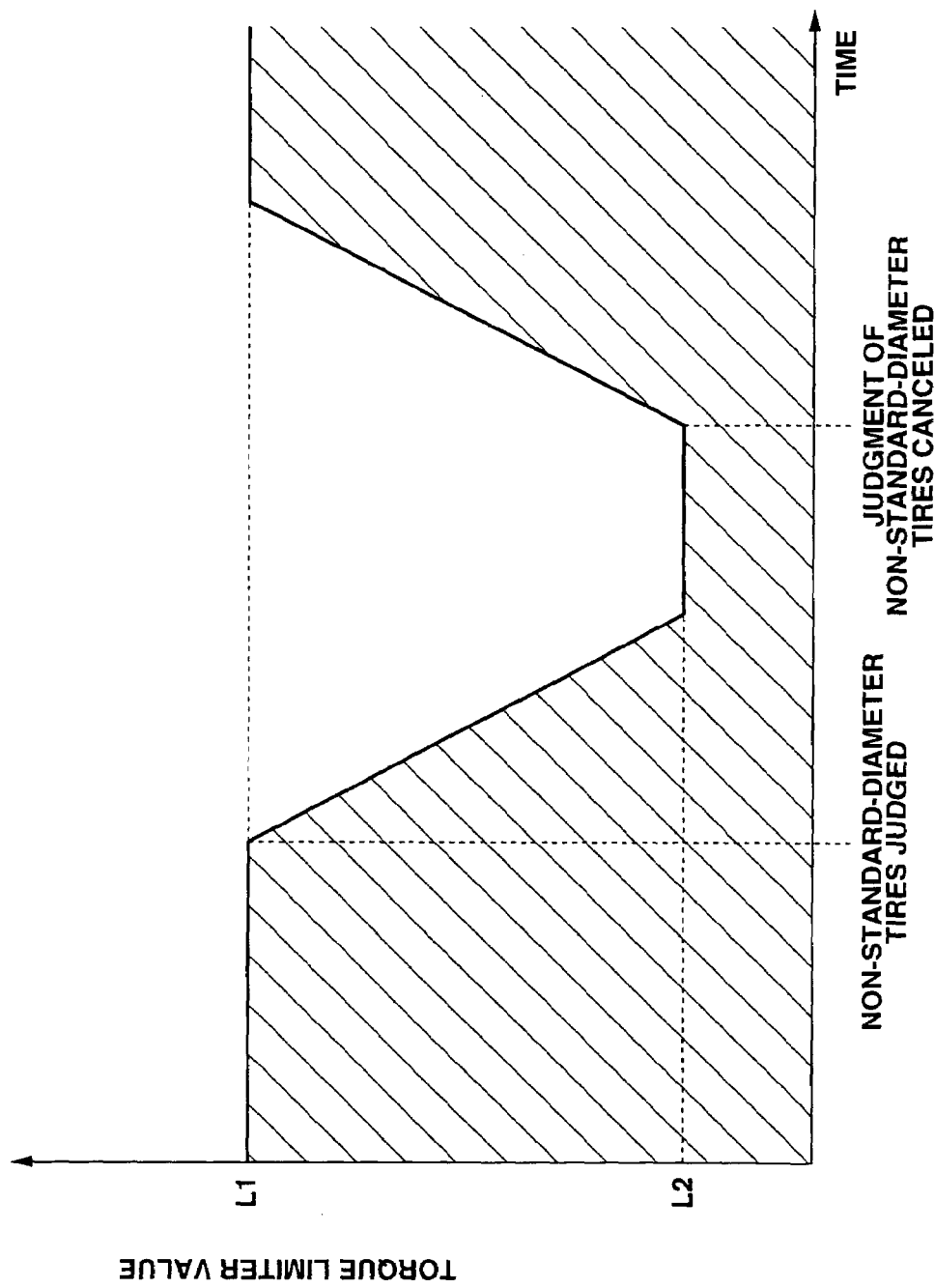
FIG. 3 is an explanatory diagram which illustrates a control region by a torque limiter.

FIG. 3 shows an example of change of the torque limiter value between the ordinary control state and the specific control state when mounting nonstandard-diameter tires. With this example shown in FIG. 3, in the event of determining the mounting state of nonstandard-diameter tires with regard to the torque limiter value in the ordinary control state shown with the line L1, the torque limiter value is lowered slowly up to the line L2, and even in the event of transition from the ordinary control state to the specific control state, controlling the engaging torque of the transfer clutch 5 within a range from the torque limiter indicated by L1 to the torque limiter indicated by L2 avoids adverse effects on the performance of the vehicle, whereby deterioration of driving stability and driving performance can be kept to a minimum.

On the other hand, in Step S101, in a state wherein the specific control state has not been determined, that is to say, in the event that determination of the specific control state is disengaged so as to make the transition to the ordinary control state, the processing proceeds from Step S101 to Step S104, where the torque limiter value is updated by adding the predetermined constant A2 to the present torque limiter value, thereby raising the torque limiter value slowly up to the maximal torque limiter value at the ordinary control state. Note that the maximal torque limiter value is preset as the maximal value of the engaging torque of the transfer 5 wherein performance and driving stability of each unit can be ensured, taking the output from the engine or the configuration of the driving force transmission system or the like into consideration.

That is to say, as shown in FIG. 3, in the event that determination of the mounting state of nonstandard-diameter tires is disengaged so as to make the transition from the specific control state to the ordinary control state, the torque limiter is raised slowly from the torque limiter value indicated by L2 up to the torque limiter value of the ordinary control state indicated by L1, whereby excessive change on the performance of the vehicle can be avoided.

In this case, the relation between the constant A2 for determining variation of the torque limiter rate per time increment when making the transition from the specific control state to the ordinary control state, and the constant A1 for determining variation of the torque limiter rate per time increment when making the transition from the ordinary control state to the specific control state, is suitably set according to the control state, as shown in the following cases (a) through (c).

(a) A2<A1

In the event that transition from the ordinary control state to the specific control state occurs due to an increase in oil temperature of the rear differential 7 or the like, following which the specific control state is disengaged, relatively increasing the variation of the torque limiter value rate per time increment at transition from the ordinary control state to the specific control state lowers the oil temperature immediately.

(b) A2>A1

In the event that a state wherein nonstandard-diameter tires are mounted is determined and transition from the ordinary control state to the specific control state is made, following which the determination of the mounting state of nonstandard-diameter tires is disengaged, relatively increasing the variation of the torque limiter value rate per time increment at transition from the specific control state to the ordinary control state speeds the recovery to the ordinary control state.

(c) A2 is approximately equal to A1

In the low vehicle speed range, setting the variation of the torque limiter value rate per time increment at transition from the ordinary control state to the specific control state and that at transition from the specific control state to the ordinary control state generally the same, keeps adverse effects on the performance of the vehicle due to switching the control state to a minimum.

Moreover, in Step S105 following Step S104, whether or not the updated torque limiter value exceeds the maximal torque limiter value in the ordinary control state is confirmed, and in the event that the torque limiter value does not exceed the maximal torque limiter value in the ordinary control state, the processing proceeds from Step S105 to Step S107. Also, in the event that the updated torque limiter value exceeds the maximal torque limiter value in the ordinary control state, the processing proceeds from Step S105 to Step S106, where the torque limiter value is fixed to the maximal torque limiter value in the ordinary control state, then the processing proceeds to Step S107.

As described above, in Step S107, whether or not center differential instruction torque which is set according to a driving state of the vehicle exceeds the torque limiter value is confirmed, and in the event of not exceeding the torque limiter value, the processing escapes from the routine without changing the center differential instruction torque. Also, in the event that the center differential instruction torque exceeds the torque limiter value, the processing proceeds from Step S107 to Step S108 so as to regulate the center differential instruction torque with the torque limiter value, then the processing escapes from the routine.

As described above, the torque limiter is changed continuously between the ordinary control state wherein the engaging torque of the transfer clutch 5 as a coupling mechanism is controlled according to the driving state, and the specific control state wherein the driving force transmission system must be protected by reducing the engaging torque of the transfer clutch 5, and the engaging torque of the transfer clutch 5 is controlled to keep below this torque limiter value, whereby excessive change of torque at transition between the ordinary control state and the specific control state can be avoided, and moreover, adverse effects on driving stability and driving performance under the specific control state can be kept to a minimum.

Further, with the present invention, it is apparent that a wide range of different embodiments can be formed on the basis of the present invention without departing from the spirit and scope of the present invention. The present invention is not restricted by any specific embodiment except as limited by the appended claims.

What is claimed is:

1. A driving force distribution control device for a vehicle for controlling engaging force of a coupling mechanism so as to change transmission torque, thereby distributing driving force, said device comprising:
   means for determining a mounting of a nonstandard-diameter tire;
   means for continuously changing a torque limiter which limits engaging force of said coupling mechanism, from a limiter value in an ordinary control state according to a driving state, to a limiter value in a specific control state at the time of determining the mounting of the nonstandard-diameter tire;
   means for controlling engaging force of said coupling mechanism so as to be kept below the limiter value of the torque limiter in every control state; and
   means for setting amount-of-change of the torque limiter per time increment at transition from the ordinary control state to the specific control state and amount-of-change of the torque limiter per time increment at recovery from the specific control state to the ordinary control state such that the latter is relatively larger than the former.

2. The driving force distribution control device of claim 1, wherein said device comprises:
   a transfer control unit which includes said means for continuously changing said torque limiter, said means for controlling said engaging force, and said means for setting said amount-of-change of the torque limiter per time increment.

3. The driving force distribution control device of claim 2, wherein said transfer control unit receives a plurality of signals and calculates an instruction value for engaging torque based on said plurality of signals.

4. The driving force distribution control device of claim 3, wherein said plurality of signals comprise at least one of a wheel speed sensor signal, throttle position sensor signal, brake switch signal, hand brake switch signal, lateral acceleration sensor signal and oil temperature sensor signal.

5. The driving force distribution control device of claim 4, wherein in said specific control state, said transfer control unit confirms whether a present value of said torque limiter exceeds a maximal value of an allowed torque value in said specific control state.

6. The driving force distribution control device of claim 5, wherein in the event that a present value of said torque limiter exceeds the maximal value of the allowed torque in the specific control state, said transfer control unit gradually reduces the value of said torque limiter by subtracting a constant A1 from the present value of said torque limiter.

7. The driving force distribution control device of claim 6, wherein in the event of transition from the specific control state to an ordinary control state, said transfer control unit gradually increases the value of said torque limiter to the maximal value of the torque limiter in the ordinary control state by adding a constant A2 to the present value of the torque limiter.

8. A driving force distribution control device for a vehicle for controlling engaging force of a coupling mechanism so as to change transmission torque, thereby distributing driving force, said device comprising:

means for continuously changing a torque limiter, which limits engaging force of the coupling mechanism, from a limiter value in an ordinary control state according to a driving state to a limiter value in a specific control state at a time of detecting any abnormal increase in oil temperature in a driving force transmission system;

means for controlling engaging force of the coupling mechanism so as to be kept below the limiter value of the torque limiter in every control state; and means for setting amount-of-change of the torque limiter per time increment at transition from the ordinary control state to the specific control state and amount-of-change of the torque limiter per time increment at recovery from the specific control state to the ordinary control state such that the former is relatively larger than the latter.

9. A driving force distribution control device for a vehicle for controlling engaging force of a coupling mechanism so as to change transmission torque, thereby distributing driving force, the device comprising:

means for continuously changing a torque limiter, which limits engaging force of the coupling mechanism, from a limiter value in an ordinary control state according to a driving state to a limiter value in a specific control state that protects a driving force transmission system;

means for controlling engaging force of the coupling mechanism so as to be kept below the limiter value of the torque limiter in every control state; and means for setting amount-of-change of the torque limiter per time increment at transition from the ordinary control state to the specific control state and amount-of-change of the torque limiter per time increment at recovery from the specific control state to the ordinary control state such that the former and the latter is substantially equal at the low speed range of the vehicle.

* * * * *